PARALLEL DATA SKEW CORRECTION SYSTEM

Filed Feb. 24, 1961 2 Sheets-Sheet 1

INVENTOR.
ANDREW GABOR
BY
Alfred W. Barber
ATTORNEY

INVENTOR.
ANDREW GABOR
BY Alfred W. Barber
ATTORNEY

United States Patent Office 3,196,419
Patented July 20, 1965

3,196,419
PARALLEL DATA SKEW CORRECTION SYSTEM

Andrew Gabor, Port Washington, N.Y., assignor to Potter Instrument Company, Inc., Plainview, N.Y., a corporation of New York Filed Feb. 24, 1961, Ser. No. 91,441
6 Claims. (Cl. 340—174.1)

The present invention concerns digital recording and, in particular, methods of and means for recording high density digital bits on a web-like recording medium.

Digital computers utilize tape recording for various purposes, generally where it is necessary to store a large amount of information. Since the amount of information to be recorded is large, it is important that the use of the recording medium be effective. The information is recorded in the form of digital bits. In a system set forth in an application for Letters Patent of Andrew Gabor entitled "High Density Recording System," filed on May 3, 1960 and bearing Serial Number 26,538 a high density recording by magnetic state reversals on magnetic tape is described. In this system the magnetic state is reversed once for each bit of information and a second time for a "yes" (or "1") bit while no second reversal represents a "no" (or "0"). This mode of recording packs information bits contiguously and results in a high density of recorded information.

One of the problems encountered in high density recording is caused by skew. It is usual to record a number of parallel tracks on the recording tape. The high density system referred to above is self-clocking i.e. each of the parallel tracks automatically carries information which can be used as a clock. However, a bit of information in one track on one edge of the recording tape must correspond with a companion (parallel) bit on the other edge. Where high density of the bits is utilized, even small twisting or stretching of the recording tape will result in displacing corresponding bits relative to each other. Thus, if individual recorded bits across the tape are picked up simultaneously by a reproducing device, it may be found that some of the bits belong with bits which have already been picked up.

According to the present invention the bits forming the recorded information are reproduced or picked up simultaneously in all channels, the picked up bits are all delayed by an amount at least as great as the greatest difference which can exist at the pick ups between corresponding bits and then the bits are delayed so that corresponding bits are reproduced simultaneously. The preferred way in which this is accomplished amounts to a resynchronization of the bits forming a parallel combination. The bits are picked up from the recording medium separately for each of the parallel tracks. Each bit is stored at least until a time when its corresponding bits from all other tracks have been picked up and then the stored bits are removed from storage simultaneously a bit at a time to provide the required parallel signal.

Accordingly one object of the present invention is to provide methods of and means for realigning digital information bits forming a parallel signal of plural elements and which have been picked up from a recording medium in disarrayed fashion.

Another object is to provide methods of and means for resynchronizing digital bits forming a parallel signal which have been disturbed from their normal time of occurrence positions.

Still another object is to synchronize a plurality of selfclocking parallel bits which do not originate in step.

A further object is to compensate for the effects on arrival time of parallel information bits caused by twisting or stretching of a digital recording medium.

These and other objects will be apparent from the detailed description of the invention given in connection with the various figures of the drawing.

Figure 1:
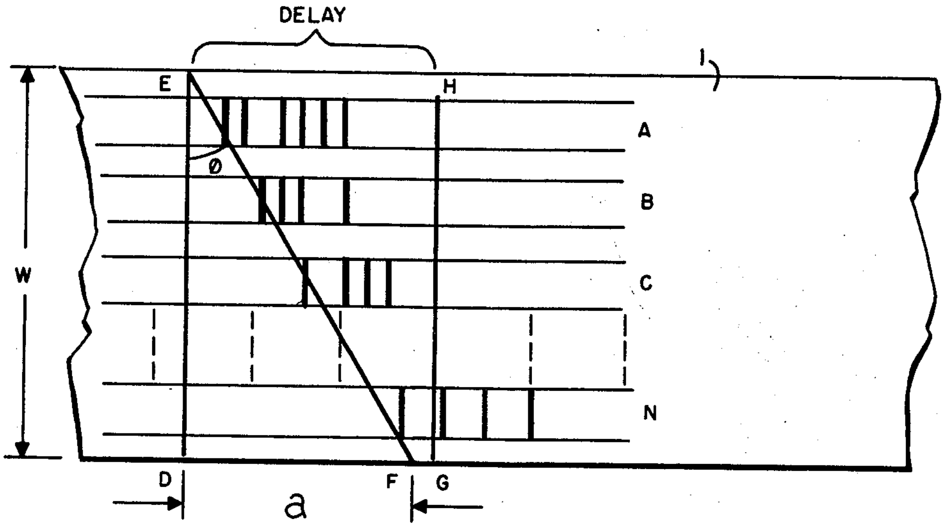
FIG. 1 is a representation of digital information on a tape-like recording medium showing one source of parallel bit displacement.

FIG. 1 shows a recording medium in tape form 1 upon which has been recorded a plurality of parallel bit information tracks A, B, C through N. This recording consists in a great plurality of transitions of state of the medium in which a bit from each track must be reproduct simultaneously to form a coded information character. Line EF has been drawn to represent the line along which corresponding bits of information actually lie due to twisting or selective stretching of the recording medium and which have become displaced from the in phase pick up line DE. It will be seen that if "$a$" equals the displacement distance of an actual bit from its theoretically correct position, W equals the width of the recording on the medium between outside tracks, $\phi$ equals the displacement angle, and V equals the lineal speed of the recording medium past the pick up line, then $t_d$, the delay time between an actual bit and its correct time position may be found from the following equations:

$$a=W \tan \phi \quad (1)$$

$$t_d=a/V=\frac{W \tan \phi}{V} \quad (2)$$

Thus in order to be able to resynchronize the bits, a delay at least equal to $t_d$, for the worst possible condition is required. It will be apparent that, if all bits are delayed by an amount varying from this maximum for the worst condition down to some low value for the least disturbed bit, that all bits making up a parallel bit character may be released from storage at the same time providing a resynchronized signal.

Figure 2:
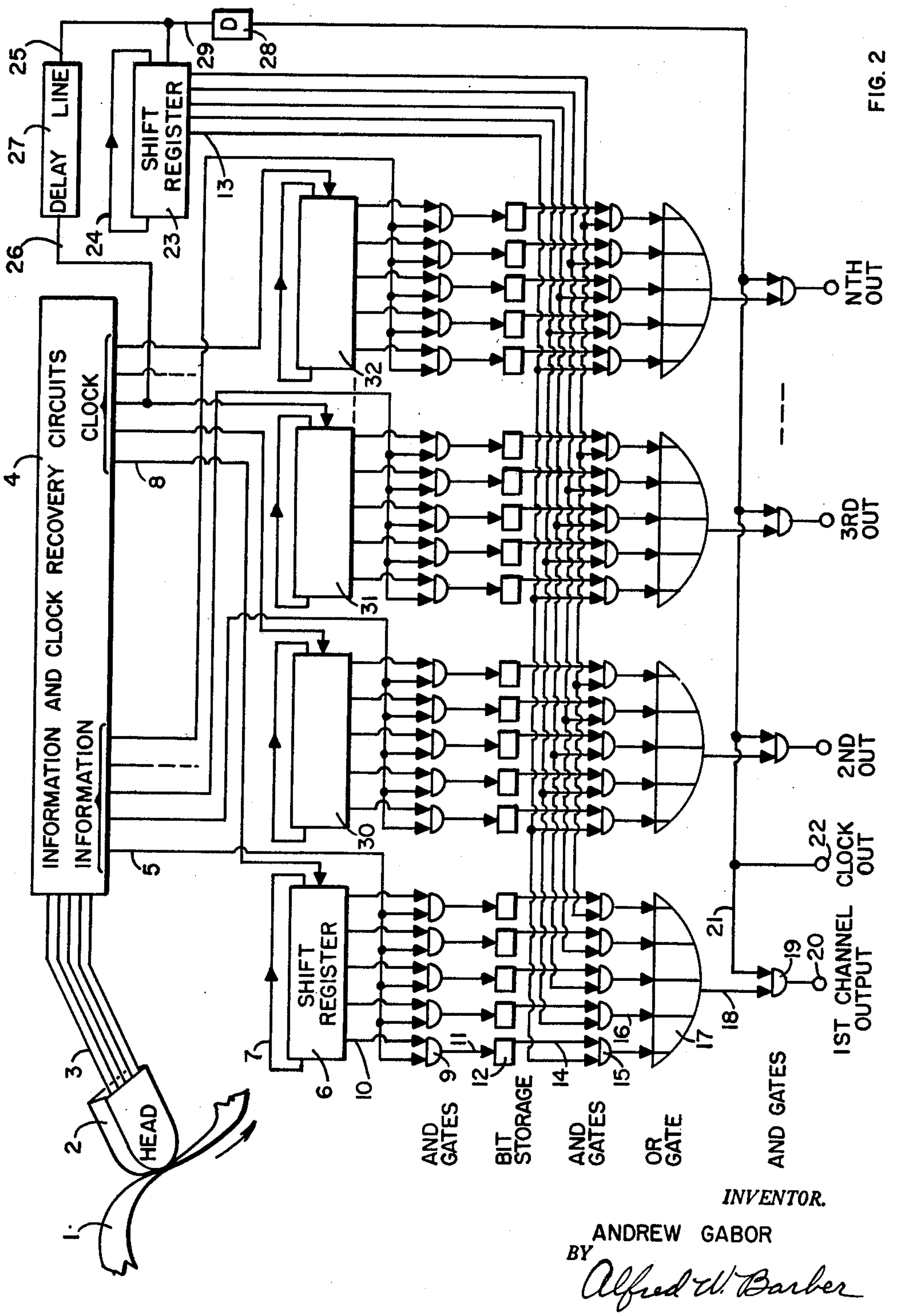
FIG. 2 is a block diagram of a preferred system for resynchronizing the parallel bit information in accordance with the present invention.

FIG. 2 shows how digital bits recorded on a tape-like medium 1 are picked up by a suitable reproducer such as head 2 and are fed to information and clock recovery circuits 4 over parallel circuits 3, one for each information track. This information and clock recovery device 4 may be any suitable device for receiving high density self-clocking parallel track recordings and producing independent information outputs over lines 5 and clock signals over lines 8. One of such suitable device is set forth in detail in the above referred to application. Each information line 5 is connected to a plurality of "and" gates 9. Clock signals derived from the same track as the information on lines 5 is supplied over one of lines 8 to advance shift register 6 having feed-back connection 7. Shift register 6 provides a circulating "one" and is connected by a plurality of parallel lines 10 to gates 9 so that an output is provided successively over lines 11 as information bits coincide in time and position with clock pulses. This successively fills bit storage units 12 with the information bits. The remainder of the information lines 5 and clock lines 8 are connected to shift registers 30, 31 . . . 32 associated with similar gates and storage units as in the case of register 6. As information bits appear on these other lines, the associated bit storage units start to fill. There must be a sufficient number of bit storage units so that by the time the last bit unit is filled the first bit from the track showing the latest time of arrival must have reached its storage. Thus, with five bit storage units used as shown, the greatest time difference which may be accomodated will be four times the time between two successive bits. When this stage of the operation has been reached, at least one information bit per storage location and hence representing at least one full parallel character exists in bit storage. At any time after this instant, the plurality of parallel bits belonging together to represent a character may be extracted from storage simultaneously, i.e. in synchronism.

The feeding out of the resynchronized parallel bit information from storage is accomplished by means of an auxiliary shift register 23 having feed-back loop 24 and advanced by clock signals derived from one of lines 8 over line 26, through delay line 27 and over line 25. Shift register 23 is connected to a plurality of "and" gates 15 over lines 13, one of "and" gates 15 being provided for each bit storage unit 12 and connected thereto over a line 14. One of lines 13 goes to a corresponding one of "and" gates 15 associated with each of the shift registers 6, 30, 31 . . . 32 so that each time register 23 is stepped corresponding parallel bits are simultaneously stepped to corresponding "or" gate 17 over a corresponding one of lines 16. The first group of bits to be stepped out will be the first bits to arrive in storage but whereas they arrived at different times, they are stepped out simultaneously as desired. The delayed clock pulses on line 25 are now applied to a further delay line 28 over line 29 and the output of this delay line is applied over line 21 to output "and" gates 19 which are also connected to corresponding "or" gates 17 over lines 18. This delay is provided to allow time for the shift register 23, and gates 15 and 17 to function so that the bits are presented ready to be gated to their respective output terminals 20. The clock on line 21, since it controls the simultaneous stepping of bits to parallel output terminals, will be a true clock for all the output bits and is made available at terminal 22. These resynchronized parallel output bits and corresponding clock may now be utilized in any desired manner.

Returning to the requirements of the time storage capacity of the bit storage units and the requirement of time delay in line 27 it will be apparent that both of these must be modified to meet any possible set of conditions. If the clock pulses at 26 are taken from the clock line receiving clock signals derived from substantially the center track of the recording, the clock signals will arrive late or early by not more than about one-half the total possible displacement. However, since this may be either early or late, the capacity of the bit storage units 12 must be at least as great as the maximum possible bit displacement time.

Figure 3:
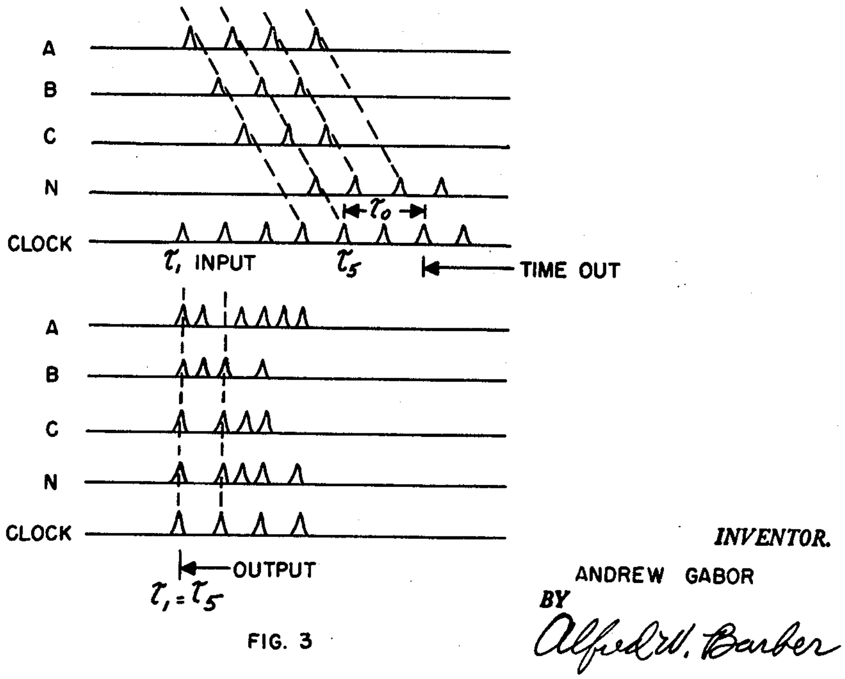
FIG. 3 is a representation of signals as picked up from the recording medium.

FIG. 3 shows a comparison between the timing of parallel input bits before they have been resynchronized and the output bits after resynchronization as performed by the apparatus represented in FIG. 2. The signals represented along lines A, B, C through N represent the relative timing of signals as picked up from the recording medium. The dotted lines are drawn through signals which belong to a common character and, hence, signals which should lie along vertical lines. If signals are selected simultaneously along vertical lines, they will belong to different characters and will not represent the bits belonging to one element of a true parallel signal. The time *t*, may represent the timing signal which occurs when the first or most advanced signal takes place. The $t_5$ represents a later time which is at least later than the most retarded bit signal and hence may be the double delayed time at which the clock pulsed may be started (through relays 27 and 28 in FIG. 2). This time has been shown to coincide with $t_1$ in the output signals where all signals have been delayed and reclocked. Thus the output signals shown are aligned vertically so that the parallel signal at $t_1$ etc. is made up of corresponding bits from A, B, C . . . N and represents the true and desired parallel output signal.

Since the blocks comprising FIG. 2 contain well known circuit elements such as "and" circuits "or" circuits, shift registers, bit storage and delay lines, no actual circuit details are felt to be necessary. Conventional circuits or their equivalents may be used as indicated as will be evident to those skilled in the art.

In order to clarify terms used in the specification and claims the following definitions are made: The term "parallel information" or "parallel bit information" or "signals" means signals made up of several bits occurring simultaneously usually forming a single character. This signal may be taken to include any parity bits which may be utilized. The term "bit" refers to the transition or transitions comprising a single information cell. "Clock signals" are signals forming a regular pattern utilized for timing purposes and derived from self-clocking signals. "Self-Clocking" signals are basically information signals but of such form that clock signals may be derived therefrom and hence not requiring separate or additional clock or timing signals in the recording medium. The term "shift register" is used to designate a device which when provided with a series of input pulses, produces an output which pulses successively a number of parallel output circuit. It may be taken to describe a device which circulates a "one" stepped in response to input pulses, the "one" appearing successively on parallel output circuits, ordinarily one output circuit per stage of the register. The term "skew" has been defined in the description above but, briefly, designates a more or less regular proportional time displacement of bits which are intended for simultaneous occurrence in a parallel bit signal. The number of storage devices per bit termed "integer" in the claims may be of the order of five as shown in the drawing although it may be more or less depending on the degree of skew encountered.

While only one embodiment has been shown and described many modifications will be apparent to those skilled in the art and within the spirit and scope of the invention as set forth specifically in the appended claims.

What is claimed is:

1. In a system for reproducing multi-channel parallel bit information signals from self-clocking signals received in skewed array, the combination of, means for deriving separate clock and information signals from skewed parallel bit self-clocking signals, a plurality of information storage devices, a plurality of "and" gates, at least one shift register for each channel for directing information signals to said storage devices through said "and" gates and under control of said clock signals, delay means connected to receive clock signals produced by said means for deriving separated clock and information signals for providing an output clock signal, and a shift register coupled to the output of said delay means for releasing deskewed parallel information signals from said storage devices.

2. In a system for reproducing multi-channel parallel bit information signals from high density self-clocking bit cell signals received in skewed array, the combination of, means for separating clock and information signals from skewed multi-channel parallel bit high density self-clocking signals, a shift register for each of said channels connected to receive the clock signals produced from such channel by said means for separating clock and information signals, an "and" gate for each of said channels connected to said separating means and one of said shift registers for distributing said information signals, a storage device for a plurality of bits in each of said channels coupled to said "and" gate for such channel, delay means for receiving clock signals from one of said channels and providing delayed clock signals, and gates under control of said delayed clock signals for stepping stored signals from said storage devices to provide deskewed parallel output signals.

3. In a system for reproducing multi-channel parallel bit information signals form self-clocking signals received in skewed array, the combination of, means for deriving separate clock and information signals from skewed parallel bit self-clocking signals, a plurality of bit storage devices in number equal to the number of bits in one of said parallel signals times a predetermined integer, an "and" gate for each of said storage devices coupled to said information signal deriving means, at least one shift register for each of said bits comprising a single parallel signal coupled to said "and" gates, circuits coupling said clock signal deriving means with said shift register to circulate a signal to actuate said "and" gates for directing information signal bits from said information signal deriving means to said storage devices, delay means for delaying one of said clock signals, additional "and" gates connected to said storage devices, an additional shift register coupled to said delay means for providing a stepping signal, couplings between said additional shift register and said additional "and" gates to direct delayed stepping signals to the last said gates for feeding stored bits out of said storage means, "or" gates at least equal in number to the number of bits per parallel signal connected to said additional "and" gates, further "and" gates at least equal in number to the number of bits per parallel signal connected one each to said "or" gates, additional delay means coupled to the first said delay means for further delaying said clock signals, and coupling between said additional delay means and said further "and" gates for stepping out deskewed parallel bit signals.

4. In a system for reproducing multi-channel parallel bit information signals from self-clocking signals received in skewed array, the combination of separating means for deriving separated clock and information signals from each channel of skewed parallel bit self-clocking signals, a plurality of storage devices for each of said channels, each of said storage devices operable to store an information signal, means for each channel responsive to the clock signals produced by said separating means for such channel to distribute the information signals produced by said separating means for such channel in the storage devices for such channel, delay means connected to receive clock signals produced by said separating means for producing delayed clock signals, and means connected to receive and responsive to the delayed clock signals produced by said delay means for substantially simultaneously reading out the signals stored in said storage devices at times to provide deskewed multi-channel parallel bit information signals.

5. In a system for reproducing multi-channel parallel bit information signals from self-clocking signals received in skewed array, the combination of separating means for deriving separated clock and information signals from each channel of skewed parallel bit self-clocking signals, a plurality of storage devices for each of said channels, each of said storage devices operable to store an information signal, a shift register for each of said channels connected to receive the clock signals produced by said separating means from such channel and advancing in response to each clock signal received, means for each of said channels responsive to the condition of the shift register for such channel to distribute the information signals produced by said separating means from such channel in the storage devices for such channel, delay means connected to receive clock signals produced by said separating means for producing delayed clock signals, and means connected to receive and responsive to the delayed clock signals produced by said delay means to read out the signals stored in said storage devices at times to provide deskewed multi-channel parallel bit information signals.

6. In a system for reproducing multi-channel parallel bit information signals from self-clocking signals received in skewed array, the combination of separating means for deriving separated clock and information signals from each channel of skewed parallel bit self-clocking signals, a plurality of storage devices for each of said channels, each of said storage devices operable to store an information signal, a shift register for each channel connected to receive the clock signals produced by said separating means from such channel and advancing in response to each clock signal received, means for each channel responsive to the condition of the shift register for such channel to distribute the information signals produced by said separating means from such channel in the storage devices for such channel, an additional shift register connected to receive the clock signals produced by said separating means from one channel and advancing in response to each clock signal received, and means responsive to the condition of said additional shift register for substantially simultaneously reading out signals stored in said storage devices at times to provide deskewed multi-channel parallel bit information signals.

References Cited by the Examiner

UNITED STATES PATENTS

| | | | |
|---|---|---|---|
| 2,793,344 | 5/57 | Reynolds | 340—174.1 X |
| 2,817,829 | 12/57 | Lubkin | 340—174.1 |
| 2,907,989 | 10/59 | Guerber | 340—174.1 |
| 2,921,296 | 1/60 | Floros | 340—174.1 |
| 2,970,300 | 1/61 | Witt | 340—174.1 |
| 3,076,183 | 1/63 | Willoughby | 340—174.1 |

IRVING L. SRAGOW, *Primary Examiner.*